Patented June 15, 1937

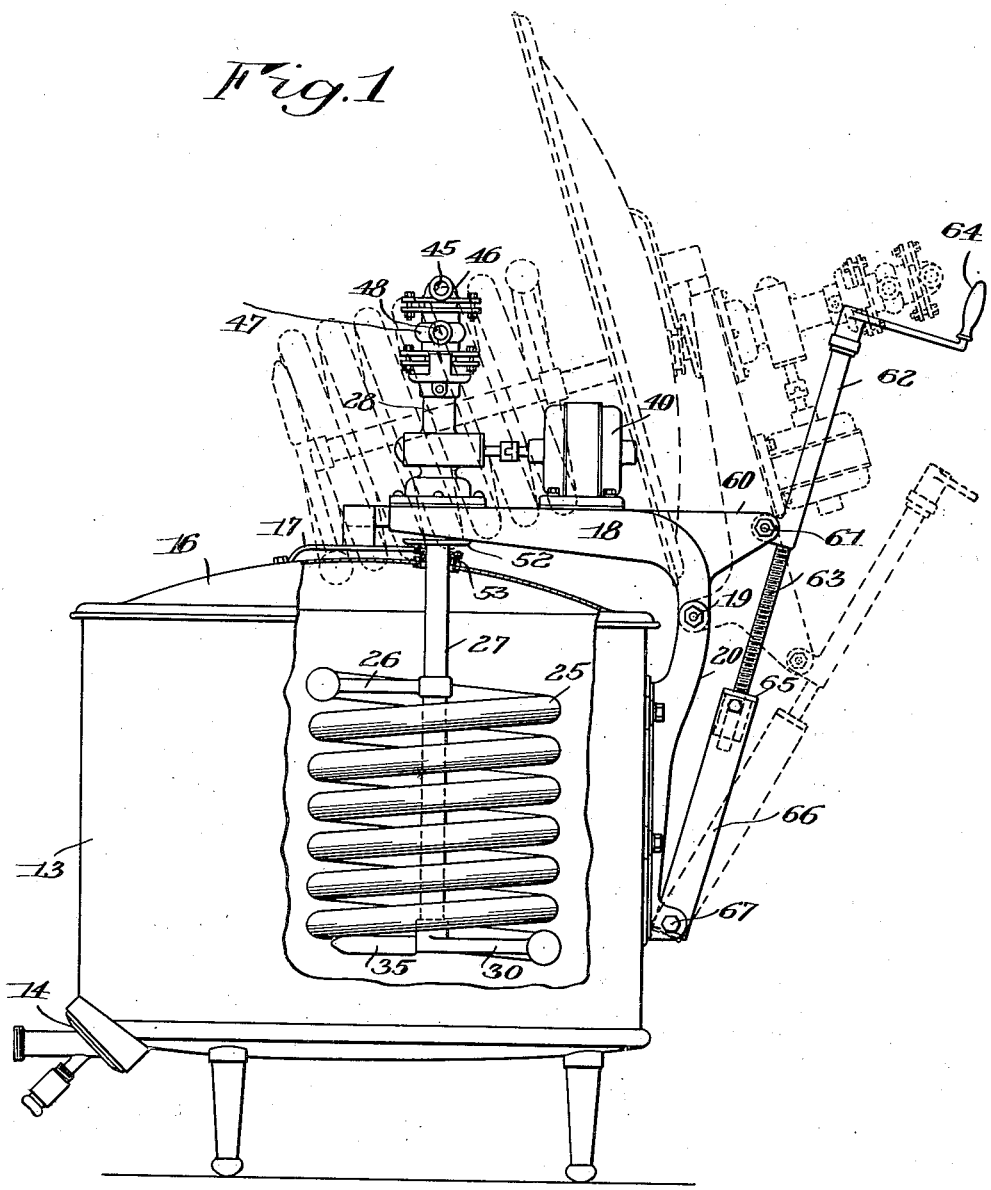

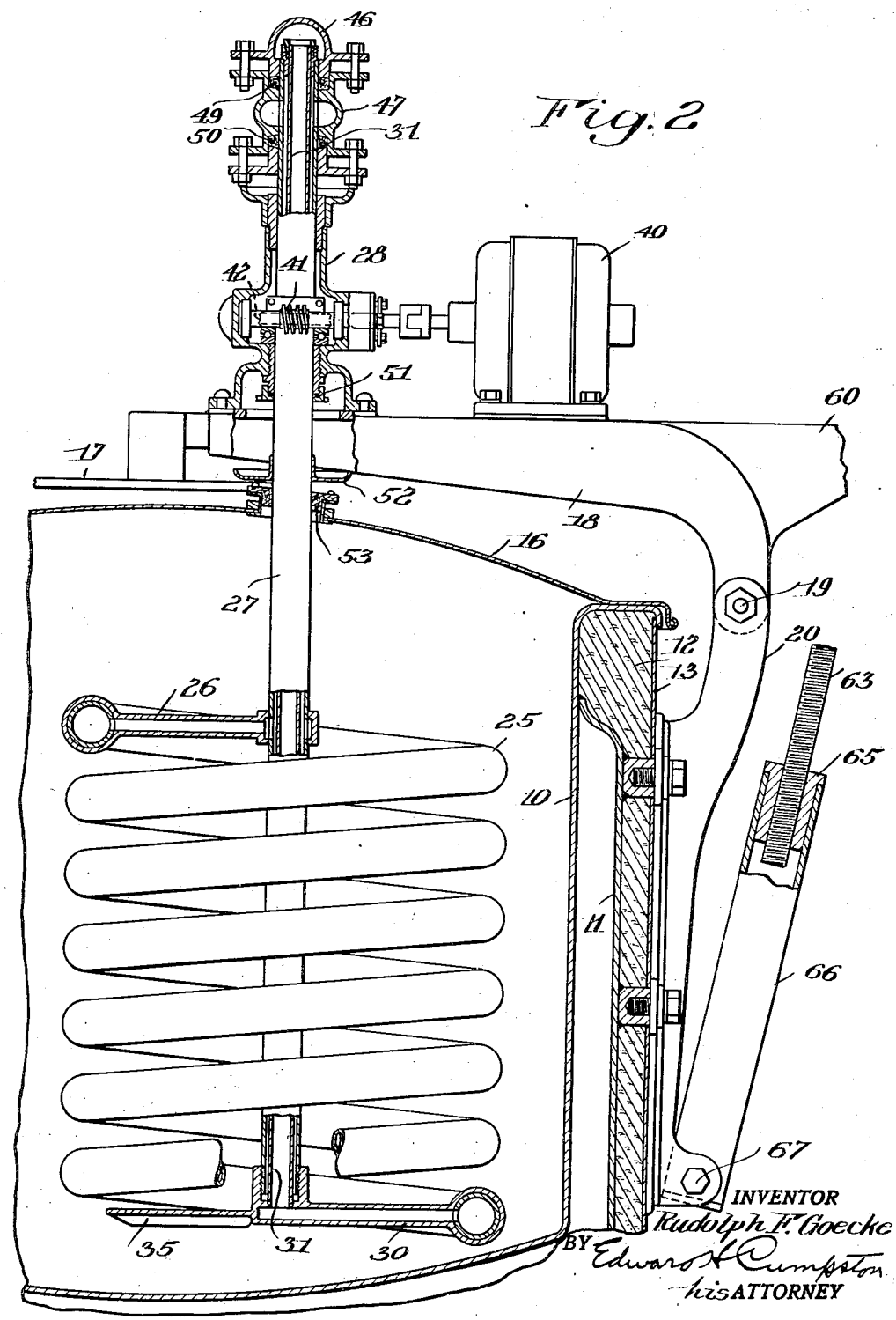

2,083,837

UNITED STATES PATENT OFFICE 2,083,837

LIQUID TREATING APPARATUS

Rudolph F. Goecke, Elyria, Ohio, assignor to The Pfaudler Co., Rochester, N. Y., a corporation of New York Application October 27, 1932, Serial No. 639,861

18 Claims. (Cl. 257—107)

The present invention relates to processing apparatus for treating or processing liquids, using this term in a broad sense as including also semi-liquids. For purposes of illustration and description, the invention is embodied in apparatus intended mainly for pasteurizing or otherwise processing milk and cream, though capable also of other uses.

An object of the invention is the provision of simplified and improved apparatus of this character, of few parts, economical to construct, easy to operate, rugged in use, and flexible in operation.

Another object of the invention is the provision of apparatus constituting a compact self-contained unit including a liquid container and liquid agitating means mounted on the container in such a way that the agitating means may be rapidly and easily removed from within the container to a more convenient position for cleaning both the agitating means and the container.

Still another object is the provision of a compact self-contained unit including a liquid container and a processing coil mounted on the container in such a way that the coil may be rapidly and easily removed from within the container to a more convenient position for cleaning both the coil and the container.

A further object is the provision of simple and effective means for opening and closing a cover or other closure means of a container, which is suitable for use when an agitator or a processing coil or both are mounted on the closure means to move therewith.

A still further object is the provision of processing apparatus including two separate heat exchanging means associated with a container, such as a coil within the container and a jacket around the container, thus attaining great flexibility and ease of operation.

To these and other ends the invention resides in certain improvements and combinations of parts, all as will be hereinafter more fully described, the novel features being pointed out in the claims at the end of the specification.

In the drawings:

Fig. 1 is a side elevation of apparatus constructed in accordance with a preferred illustrative embodiment of the invention, with parts broken away and parts in section, showing the closed position of the cover in full lines and the open position of the cover in dotted lines, and Fig. 2 is a vertical section taken substantially centrally through a part of the apparatus, on a somewhat larger scale than Fig. 1.

The same reference numerals throughout the several views indicate the same parts.

The illustrative embodiment of the invention shown in the drawings comprises a container 10 having an opening of substantial size preferably at its top, to be closed by closure means hereafter described. The container is surrounded at its sides and bottom by a jacket 11 forming heat transfer means which may be used either for heating or cooling the contents of the container. Thermal insulation 12 is applied to the outside of the container and jacket and covered by an outer covering 13. The contents of the container may be discharged through an outlet valve fitting indicated in general by the numeral 14. The container has a cover 16 secured to and mounted on the container so that it forms a unit with the container and yet is capable of being opened and closed easily and readily. The cover 16 may be secured, for example, to a bracket 17 on an arm 18 pivoted at 19 to a bracket 20 secured to the side of the container. The cover 16 itself, together with the bracket 17 and arm 18, may be considered collectively as the cover broadly, or closure means of the container.

The pivotal mounting of the cover at 19 keeps the cover connected at all times to the container, yet permits it to be easily shifted by an oscillating movement from closed to open position and vice versa.

Mounted on the cover for bodily movement therewith is an agitator for agitating the liquid contents of the container 10, or a coil for processing (either heating or cooling) the contents of the container, or both an agitator and a coil. In the present preferred embodiment, both the coil and agitating means are shown, the coil itself functioning as agitating means and also having a propeller blade as further agitating means.

The coil itself is indicated at 25 in the drawings, and is of helical shape as shown, with its axis preferably substantially vertical. The upper end of the coil, which is preferably its outlet end, is connected by a conduit or header 26 to a substantially vertical tube 27 extending upwardly through the cover 16 and mounted for rotation in suitable bearings in a casing 28 fixed to the arm 18 of the closure means.

The lower end of the coil 25, which is preferably its outlet end, is connected by a header or conduit 30 to a central tube 31 extending upwardly within the tube 27, but of sufficiently smaller diameter so that there is an annular passageway between the tubes 31 and 27. The fluid for heating or cooling the coil 25, as may be desired, preferably is supplied to and flows down through the inner tube 21, thence from the bottom of this tube through the conduit 30 and to the lower end of the coil 25, thence around the coil and upwardly therein to the conduit 26, which leads the fluid to the annular space between the tubes 27 and 31, the fluid flowing upwardly through this annular space.

As above stated, the tube 27 is mounted in bearings for rotation, and suitable means hereafter described is provided for rotating the tube, thus rotating with it the entire coil 25 and conduits 26 and 30. During such rotation, the coil itself, because of its helical shape, acts to a substantial extent as agitating means stirring up or agitating the contents of the container 10. In addition to this action of the coil itself, however, further agitating means may be employed if desired to increase the agitating effect. In the present instance, it is preferred to employ a propeller blade 35 which may conveniently be formed integrally with the conduit member 30 as shown in the drawings. When the coil is rotated, the propeller blade 35 is rotated with it and thus increases the agitating effect of the coil.

The agitating effect of the propeller and coil is further increased by mounting the coil not in the center of the container 10, but somewhat offset or eccentric with relation to the center of the container. Preferably the axis about which the coil rotates is offset in a direction toward the pivotal axis 19 of the closure means, thus bringing the entire coil assembly somewhat closer to the pivotal axis 19, which permits the coil to clear the opposite edge of the container more readily when the closure means is opened or closed.

The driving means for the agitator and coil is preferably also mounted on the closure means for bodily movement therewith, so that the entire apparatus constitutes a self-contained unit which need not have any driving connections from external sources, such as the belt drives or flexible shaft drives sometimes heretofore used in apparatus of a similar nature. Preferably, the driving means is in the form of an electric motor 40 mounted on the arm 18 and directly connected to drive a worm 41 meshing with a worm gear 42 on the tube 27, so that operation of the motor drives the worm gear and turns the tube 27 and its associated parts.

The connections for the inlet and outlet of the fluid passing through the coil 25 may be made in any suitable manner. For instance, the heating or cooling fluid for the coil may be supplied through a hose connected to an inlet opening 45 in a cap member 46 at the top of the casing 28. The space within this cap member 46 communicates directly with the interior of the inner tube 31 so that the heating or cooling fluid supplied to the cap 46 flows down the conduit 31 to the bottom of the coil 25.

Below the cap member there may be an intermediate member 47 forming a chamber communicating, by means of suitable holes in the tube 27, with the annular space between the tubes 27 and 31. The fluid after passing through the coil 25 and flowing upwardly in the annular space, is discharged into the intermediate member 47 mounted on the casing 28, and flows out through the outlet opening 48 to which may be connected a hose or other suitable discharge conduit.

Suitable packing 49 is provided between the cap 46 and the intermediate member 47, and further packing 50 below the intermediate member 47, so that liquid tight joints are provided and yet the tube 27 is permitted to rotate within the members 46 and 47.

The worm 41 and worm gear 42 preferably run in a bath of oil within the casing 28, which oil is prevented from escaping downwardly around the tube 27 by means of suitable packing 51. It is to be noted here that the inlet and outlet connections are above the oil bath for the gearing, so that if there should be any leakage of oil, it cannot by any possibility drip down onto the inlet or outlet connections nor deteriorate the hoses leading thereto. Furthermore, guard means 52 is provided in the form of an annular cup shaped member fitting tightly around the tube 27 below the packing 51, so that if any oil from the gearing should leak out through the packing, it will be caught by the guard 52 and cannot enter the container 10 to contaminate the contents thereof. Below the guard 52 is further guard means such as a washer 53 of felt or other suitable soft material, fitting relatively tightly around the tube 27 and fixed to the cover 16 in order to prevent any foreign matter from entering the container by way of the opening through which the tube 27 passes.

Convenient and easily operable means is provided for oscillating the closure means to open or close it. According to a preferred embodiment of the opening and closing means, the arm 18 is provided with a rearward extension 60 to which is pivoted at 61 a tube 62 through which extends a long screw 63 provided with an operating crank handle 64. The lower end of the screw is threaded into a nut 65 fixed in a sleeve 66 pivoted at 67 to the lower end of the bracket 20 which is fixed to the container. Such means provide a mechanical advantage or power multiplying device for raising and lowering the combined weight of the cover and its associated parts.

When the crank 64 is rotated in one direction, the screw 63 travels downwardly through the nut 65, and since this nut cannot yield upwardly, the screw is pulled downwardly, thus pulling down on the sleeve 62 and forcing the extension 60 on the arm 18 downwardly. This elevates the cover and with it the agitator and coil and driving means all mounted on the cover for bodily movement therewith, shifting them to the open position illustrated in dotted lines in Fig. 1, in which the agitator and coil are substantially out of the container and readily accessible for cleaning. It will be appreciated that frequent cleaning of these parts is advisable whenever the apparatus is used for the treatment of material intended for human consumption, such for example as the pasteurization of milk. It is also to be noted that not only are the agitator and coil, when removed from the tank by opening the cover, accessible for cleaning, but also the tank itself is rendered more accessible for cleaning its interior surfaces by reason of the fact that the agitator and coil have been removed. The whole inner surface of the tank may then be carefully wiped and cleaned without interference or obstruction by any agitator or coil.

It is obvious that rotation of the crank 64 in the opposite direction will move the screw 63 upwardly with respect to the nut 65, and thus will lower the cover to its closed position, placing the agitator and coil in their effective positions within the container.

The use of a coil within the container as well as the jacket around the container results in extremely flexible equipment capable of being used with great efficiency. For instance, if material is to be heated and then cooled, as is frequently the case with the pasteurization of milk, it is not necessary to change the connections to the coil 25 in order to supply the coil first with heating fluid and later with cooling fluid. On the contrary, it is possible to use the coil for heating alone, then merely turn off the supply of heating fluid without disconnecting the fluid connections, and introduce cooling fluid into the jacket 11 in order to cool the contents of the container.

It is also possible to rotate the agitating means without either heating or cooling the coil, thus obtaining purely an agitating action from the moving parts, and using the jacket to produce whatever heating or cooling is desired.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Liquid treating apparatus comprising a liquid container, a cover pivotally secured to the container for oscillating opening and closing movements about an axis spaced laterally outside the outline of said container, and liquid agitating and heat transfer means carried by said cover and movable bodily therewith, said agitating and heat transfer means being in an effective position substantially within said container when said cover is closed and being withdrawn to a position substantially outside of said container by the opening of the cover.

2. Liquid treating apparatus comprising a liquid container, an arm pivotally mounted on said container for oscillation with respect to the container, liquid agitating means mounted on said arm for bodily movement into and out of the container upon oscillation of said arm, a closure for said container secured to said arm for bodily movement therewith, and power means mounted on and movable bodily with said arm and operatively connected to said agitating means.

3. Liquid treating apparatus comprising a liquid container, an arm pivotally mounted on said container for oscillation with respect to the container, liquid agitating means mounted on said arm for bodily movement into and out of the container upon oscillation of said arm, and screw means for oscillating said arm.

4. Liquid treating apparatus comprising a liquid container, a bracket mounted on a side wall of said container externally thereof, cover means pivotally secured to said bracket for oscillating opening and closing movements, and heat transfer means carried by said cover means and movable bodily therewith, said heat transfer means being in an effective position within said container when said cover means is closed and being substantially withdrawn from said container by the opening of the cover means.

5. Liquid treating apparatus comprising a liquid container, a bracket mounted on a side wall of said container externally thereof, closure means including an arm pivotally secured to said bracket for oscillating opening and closing movements, heat transfer means carried by said closure means and movable bodily therewith, said heat transfer means being in an effective position within said container when said closure means is closed and being substantially withdrawn from said container by the opening of said closure means, said heat transfer means being mounted for rotation within said container, and motor means mounted on said arm for bodily movement therewith and operatively connected to said heat transfer means to rotate the heat transfer means.

6. Liquid treating apparatus comprising a liquid container, closure means pivotally secured to said container for oscillating opening and closing movements, heat transfer means carried by said closure means and movable bodily therewith, said heat transfer means being in an effective position within said container when said closure means is closed and being substantially withdrawn from said container by the opening of said closure means, said heat transfer means being mounted for rotation within said container, motor means mounted on said closure means for bodily movement therewith and operatively connected to said heat transfer means to rotate the heat transfer means, and screw means for oscillating said closure means through its opening and closing movements.

7. A device for treating liquids, comprising a container having an upwardly extending opening, a hinged cover for said opening, a helical, rotatable, thermal treatment coil mounted to swing therewith to move into and out of said container, said coil when said cover is closed being eccentric of said container and thereby more closely adjacent one wall part thereof than another wall part thereof, the hinge for said cover being outside the horizontal section of said container and in line with said treatment coil and said first mentioned wall part, means to rotate said coil, and means simultaneously to convey thermal treatment medium therethrough.

8. A device for treating liquids, comprising a container open at the top, a hinged cover therefor mounted to swing down and up to close and open the same, a helical, hollow, rotatable, thermal treatment coil mounted on said cover to swing therewith to move into and out of said container, said coil when said cover is closed being eccentric of said container and thereby more closely adjacent one wall part thereof than another wall part thereof, the hinge for said cover being outside the horizontal section of said container, and in line with said treatment coil and said first mentioned wall part, means mounted on said cover to rotate said coil, fixed connections mounted on said cover and swinging therewith to convey thermal treatment fluid to and from said coil, and connections to supply and receive thermal treatment fluid to and from said fixed connections.

9. Liquid treating apparatus comprising a liquid container, a cover for said container, parts on said cover and container cooperating to support said cover for swinging movements on said container to open and close the same, liquid agitating and heat transfer means associated with said cover and movable out of and into the liquid in said container by the opening and closing movements of said cover, means for supplying a heat transfer medium to said liquid agitating and heat transfer means, and power means for actuating said liquid agitating and heat transfer means.

10. Liquid treating apparatus comprising a liquid container, a cover for said container having a connection therewith at one side thereof to support said cover for tilting movements on said container to open and close the same, a rotary coil associated with said cover and movable out of and into the liquid in said container by the opening and closing movements of said cover, means for supplying a heat transfer medium to said coil, and power means for rotating said coil.

11. Liquid treating apparatus comprising a liquid container, a cover for said container having a connection therewith at one side thereof to support said cover for tilting movements on said container to open and close the same, liquid agitating and heat transfer means associated with said cover and movable out of and into the liquid in said container by the opening and closing movements of said cover, means continuously connected with said liquid agitating and heat transfer means in both open and closed positions of said cover for supplying a heat transfer medium thereto, and power means for actuating said liquid agitating and heat transfer means.

12. Liquid treating apparatus comprising a liquid container, a cover for said container having a connection therewith at one side thereof to support said cover for tilting movements on said container to open and close the same, a rotary coil associated with said cover and movable out of and into the liquid in said container by the opening and closing movements of said cover, means continuously connected with said rotary coil in both open and closed positions of said cover for supplying a heat transfer medium thereto, and power means for rotating said coil.

13. Liquid treating apparatus comprising a liquid container having an open top, a cover for said container having a pivotal connection therewith to support said cover for a tilting movement from a substantially horizontal closed position to a substantially upright open position, a rotary coil associated with said cover and movable out of and into the liquid in said container by the opening and closing movements of said cover, means for supplying a heat transfer medium to said coil, and power means also associated and movable with said cover for rotating said coil.

14. Liquid treating apparatus comprising a liquid container, a cover for said container movably connected therewith for opening and closing movements, a rotary coil associated with said cover and movable out of and into the liquid in said container by said opening and closing movements of said cover, means for supplying a heat transfer medium to said coil, power means for rotating said coil, and a mechanical advantage device for moving said cover to open and closed positions.

15. Liquid treating apparatus comprising a liquid container, a cover for said container movably connected therewith for opening and closing movements, a rotary coil associated with said cover and movable out of and into the liquid in said container by said opening and closing movements of said cover, power means also associated and movable with said cover for rotating said coil, and a mechanical advantage device connected with said container and said cover for moving said cover to open and closed positions.

16. A liquid treating apparatus comprising a liquid container, a cover for said container movably connected therewith for opening and closing movements, a rotary coil associated with said cover for movement out of and into the liquid in said container by the opening and closing movements of said cover, means continuously connected with said coil in both open and closed positions of said cover for supplying a heat transfer medium thereto, power means also associated and movable with said cover for rotating said coil, and a mechanical advantage device connected with said container and cover for moving said cover to open and closed positions.

17. Liquid treating apparatus comprising a liquid container having an open top, a cover for closing the top of said container, parts on said cover and container cooperating to support the cover for swinging movements on said container to open and close the same, heat transfer means associated with said cover for circulating a liquid heat transfer medium and located eccentrically of said container toward said cooperating parts so as to swing clear of the container walls and be movable out of and into the liquid in said container by the opening and closing movements of said cover, and means for supplying said heat transfer medium to said heat transfer means.

18. Liquid treating apparatus comprising a liquid container having an open top, a cover for closing the top of said container, parts on said cover and container cooperating to support the cover for swinging movements on said container to open and close the same, heat transfer means associated with said cover for circulating a liquid heat transfer medium and located eccentrically of said container toward said cooperating parts so as to swing clear of the container walls and be movable out of and into the liquid in said container by the opening and closing movements of said cover, and means continuously connected with said heat transfer means in both open and closed positions of said cover for supplying said heat transfer medium thereto.

RUDOLPH F. GOECKE.